United States Patent [19]

Yamaguchi et al.

[11] Patent Number: 5,049,940

[45] Date of Patent: Sep. 17, 1991

[54] IMAGE FORMING APPARATUS

[75] Inventors: Yasuyoshi Yamaguchi; Yasuhiko Ozawa; Masataka Suzuki; Akira Sato; Yoshinori Asai; Yoshiharu Horii; Takashi Shimaoka, all of Shizuoka, Japan

[73] Assignee: Tokyo Electric Company, Ltd., Tokyo, Japan

[21] Appl. No.: 470,308

[22] Filed: Jan. 25, 1990

[30] Foreign Application Priority Data

| | | | |
|---|---|---|---|
| Jan. 30, 1989 | [JP] | Japan | 1-20349 |
| Jan. 30, 1989 | [JP] | Japan | 1-20350 |
| Jan. 30, 1989 | [JP] | Japan | 1-20351 |

[51] Int. Cl.[5] ........ G03B 15/06

[52] U.S. Cl. ........ 355/260

[58] Field of Search ........ 355/210, 211, 245, 75, 355/260

[56] References Cited

U.S. PATENT DOCUMENTS

| | | | |
|---|---|---|---|
| 4,609,276 | 9/1986 | Mitzutani | 355/210 |
| 4,681,422 | 7/1987 | Oba et al. | 355/309 |
| 4,757,344 | 7/1988 | Idewana et al. | 355/260 |
| 4,760,424 | 7/1988 | Ohba et al. | 355/245 |

*Primary Examiner*—L. T. Hix

*Assistant Examiner*—Khanh Dang

*Attorney, Agent, or Firm*—Oblon, Spivak, McClelland, Maier & Neustadt

[57] ABSTRACT

According to the present invention, an upper body which is relatively light in weight is connected to a lower body which contains a paper conveying path and a transfer portion disposed in the paper conveying path, and support portions formed in the lower body are brought into abutment with an image forming portion comprising an image carrier unit and a developing unit, the image carrier unit having an image carrier, and in this state the image forming portion is fixed by a retaining device.

7 Claims, 4 Drawing Sheets

IMAGE FORMING APPARATUS

FIELD OF THE INVENTION AND RELATED ART STATEMENT

The present invention relates to an image forming apparatus for forming an image on an image carrier in accordance with an electrophotographic method.

According to the prior art, an image carrier in an image forming apparatus is supported removably for the remedying of jam, for maintenance, or for replacement of the image carrier. According to one supporting method for the image carrier, an upper body is mounted to a lower body in which are mounted a paper conveying path and a transfer portion, and the image carrier is mounted to the upper body so as to be removable to this side along its axial direction. According to another supporting method, a support portion which removably supports an image carrier unit having an image carrier together with a developing unit is provided in a lower body having an upper opening and in which are contained a paper conveying path and a transfer portion, and the image carrier unit and the developing unit are pressed downwards elastically by a pressing member provided in an upper body.

Generally, in the lower body, the number of parts disposed is large and the total weight thereof is also large, so the lower body is required to have high rigidity. Since the lower body is placed in a stable base or desk, it does not vibrate so much. On the other hand, the number of parts mounted in the upper body is small, the total weight thereof is small, and the upper body is reduced in weight so as to be opened and closed easily. Consequently, the upper body is apt to vibrate as compared with the lower body.

In the first method referred to above, a large working space is required for the mounting and removal of the image carrier because the carrier is pulled in its axial direction, and there is anxiety about its supported state over a long period because the image carrier is supported in a cantilevered state. Although a locking lever is provided on this side for preventing axial movements of the image carrier, it is impossible to prevent slight axial movements of the image carrier caused by variations in length of the image carrier or in association with the mounting position of the locking lever. In an effort to solve this problem there has been proposed pressing the other end of the image carrier by a pressing member in opposition to the locking lever, but if the pressing force of the pressing member is small, there will be no effect, while a strong pressing force requires a considerable labor for turning the locking lever, and the fatigue of the pressing member itself is accelerated. Besides, the vibration of the upper body is easily transmitted to the image carrier through the pressing member. Further, since the image carrier is held by the upper body, while the transfer portion, etc. are held by the lower body, the gap between the image carrier and the transfer portion which gap requires a relative positional accuracy may be changed by variations in the relative position between the upper and lower bodies. In the foregoing second method, the vibration of the upper body is transmitted to the image carrier unit and the developing unit through the pressing member, thus exerting a great influence on image formation.

OBJECTS AND SUMMARY OF THE INVENTION

It is the first object of the present invention to diminish the vibration transmitted to the image forming portion.

It is the second object of the present invention to set the positions of the image forming portion and the transfer portion relative to each other accurately.

It is the third object of the present invention to attain the reduction of the working space by constituting an image forming apparatus so that the image forming portion thereof can be mounted and removed from above.

It is the fourth object of the present invention to facilitate the mounting and removal of the image forming portion.

It is the fifth object of the present invention to diminish the vibration transmitted from the upper body to the image forming portion.

In the present invention, an upper body is connected for opening and closing motion to the upper portion of a lower body in which are contained a paper conveying path and a transfer portion disposed in the paper conveying path; there is provided an image forming portion which comprises an image carrier unit having an image carrier and a developing unit; a support portion which is in abutment with the image forming portion is formed in the lower body; and a retaining means which engages the image forming portion is provided. Thus, the image forming portion comprising the image carrier unit and the developing unit is supported by the support portion in the lower body to which vibration is difficult to be transmitted and is fixed by the retaining means, so it is not necessary to provide an image forming portion pressing member in the upper body. Consequently, it is possible to diminish the vibration transmitted from the upper body to the image forming portion. Moreover, by mounting the image forming portion and the transfer portion in the lower body it is made possible to accurately determine the positions of the two relative to each other. Further, the working space can be reduced because the image forming portion can be mounted and removed from above the lower body perpendicular to the axial direction of the image carrier.

DETAILED DESCRIPTION OF PREFERRED EMBODIMENTS

Figure 1:
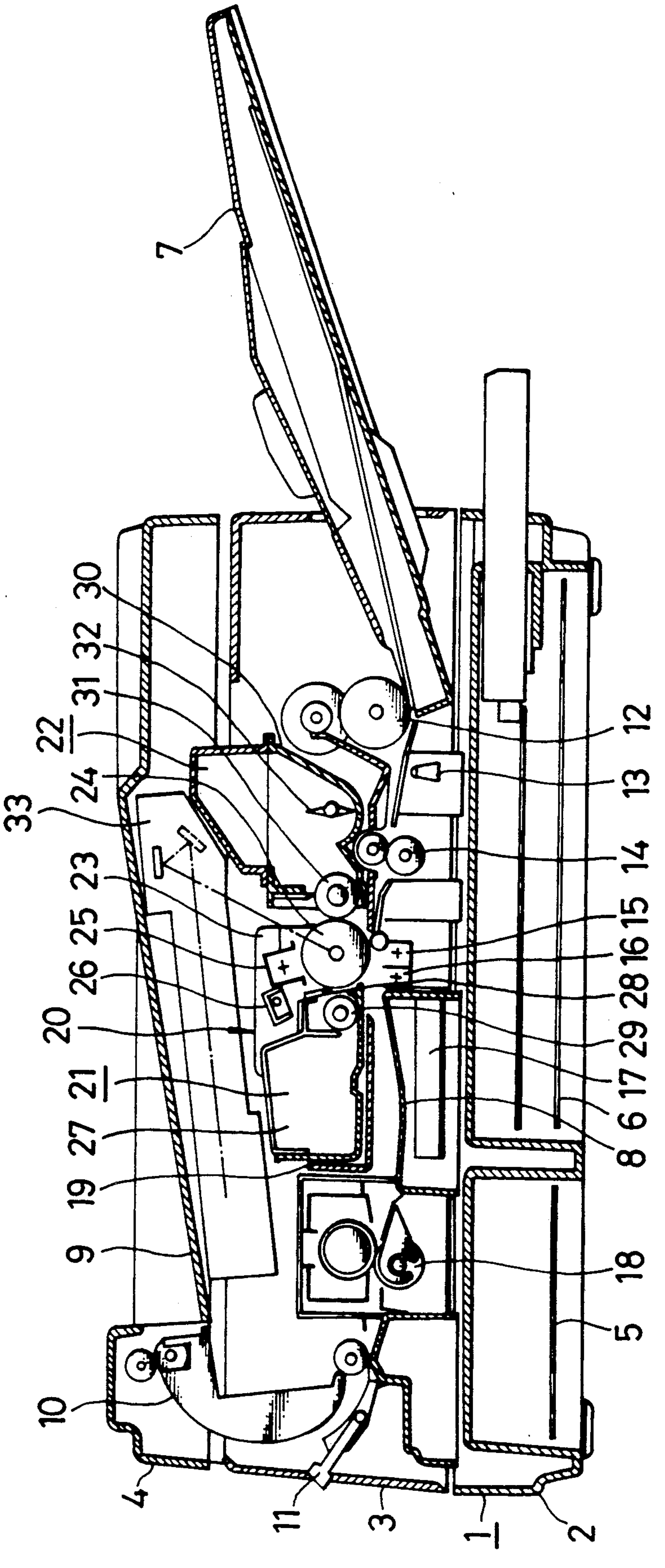
FIG. 1 is a side view in vertical section showing the entire structure of an image forming apparatus according to an embodiment of the present invention.

An embodiment of the present invention will now be described with reference to the drawings. FIG. 1 is a side view in vertical section showing the entire structure of an image forming apparatus embodying the invention. In the same figure, the reference numeral 1 denotes a lower body which constitutes a part of the body of the apparatus as an electrophotographic printer. The lower body 1 comprises a base cover 2 and an upper cover 3 which are bonded together. To the upper portion of the lower body 1 is mounted vertically pivotably one end of a top cover 4 which serves as an upper body. Mounted to the base cover 2 are a power source 5 and a circuit board 6. In the upper cover 3 there is provided a paper conveying path 8 for the conveyance of each paper received in a paper feed cassette 7. To an end portion of the paper conveying path 8 there is connected a paper discharge path 10 for discharging the paper toward a paper catch tray 9 which is formed on the upper surface of the top cover 4. In this connecting portion there is provided a changeover portion 11 for changing over the paper discharging route from one to the other between the paper discharge path 10 and a lateral direction of the lower body 1 which is on the extension of the paper conveying path 8. Along the paper conveying path 8 there are disposed in order from up- to downstream side a paper feed roller 12 which comes into contact with the top paper in the paper feed cassette 7; a start sensor 13 for optically detecting the paper being conveyed; a resist roller 14 whose rotation is controlled by a detected signal from the start sensor 13; a transfer portion 15 for transferring a developed image on a later-described image carrier 24 onto the paper; a paper separating portion 16 for separating the paper from the image carrier 24; a high voltage power supply 17; and a fixing portion 18 for fixing the transferred image on the paper while holding the paper which has passed the transfer portion 15.

In the upper cover 3 is mounted a basket 19 positioned above the paper conveying path 8 and having upper and lower openings, and in the basket 19 there is accommodated an image forming portion 20 removably, the image forming portion 20 comprising an image carrier unit 21 and a developing unit 22. The image carrier unit 21 is constituted as follows. An image carrier 24 is mounted rotatably to both side faces of a support member 23. Then, a charger 25 for imposing an electric charge on the image carrier 24, a destaticizer 26 for uniforming the electric charge on the outer periphery of the image carrier 24, and a waste toner container 27, are attached to the support member 23. Further, a blade 28 for scraping off waste toner adhered to the image carrier 24 and a roller 29 for conveying the waste toner thus scraped off toward the interior of the waste toner container 27 are attached to the waste toner container 27. The developing unit 22 comprises a toner container 30, a developing roller 31 and a toner agitating blade 32, the developing roller 31 and the blade 32 being mounted to the toner container 30 (see FIG. 5). At both end portions of the developing roller 31 there are formed flange-like projections 31*a* adapted to contact the outer peripheral surface of both ends of the image carrier 24. Further, an optical portion 33 for applying a beam of light to a photosensitive surface of the image carrier 24 is mounted to the inner surface of the top cover 4.

Figure 2:
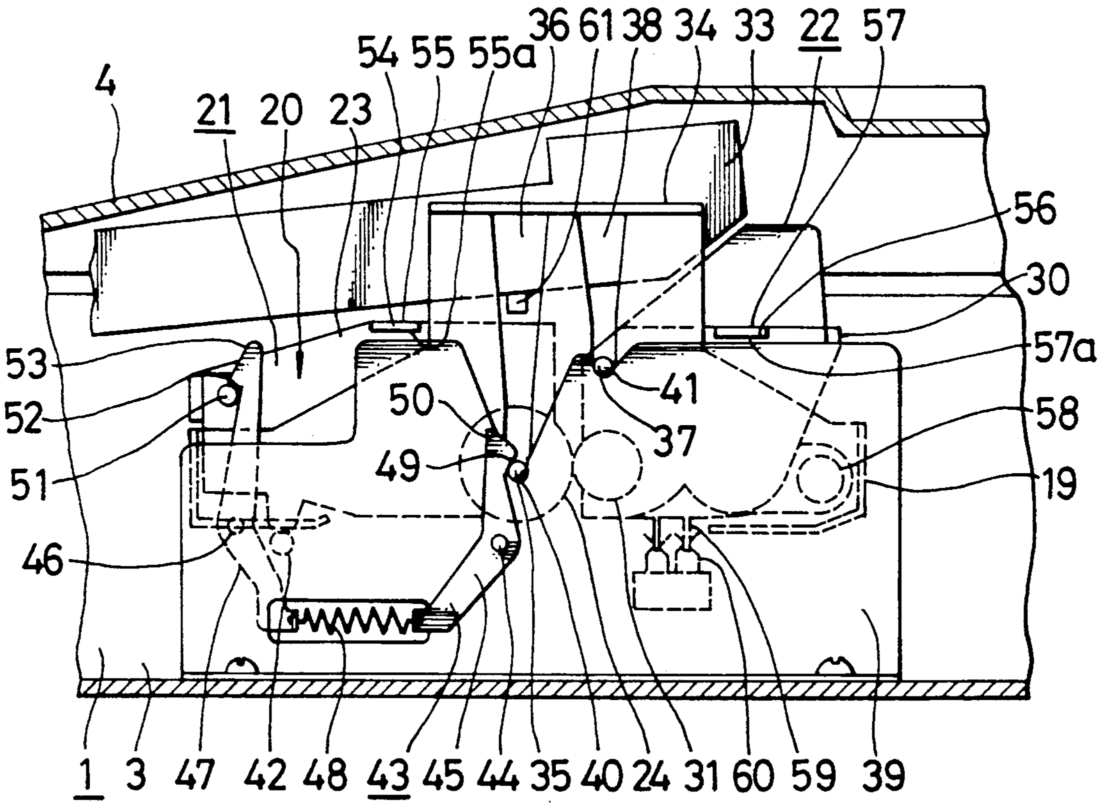
FIG. 2 is a side view in vertical section showing a support structure for a basket and an image forming portion.
Figure 3:
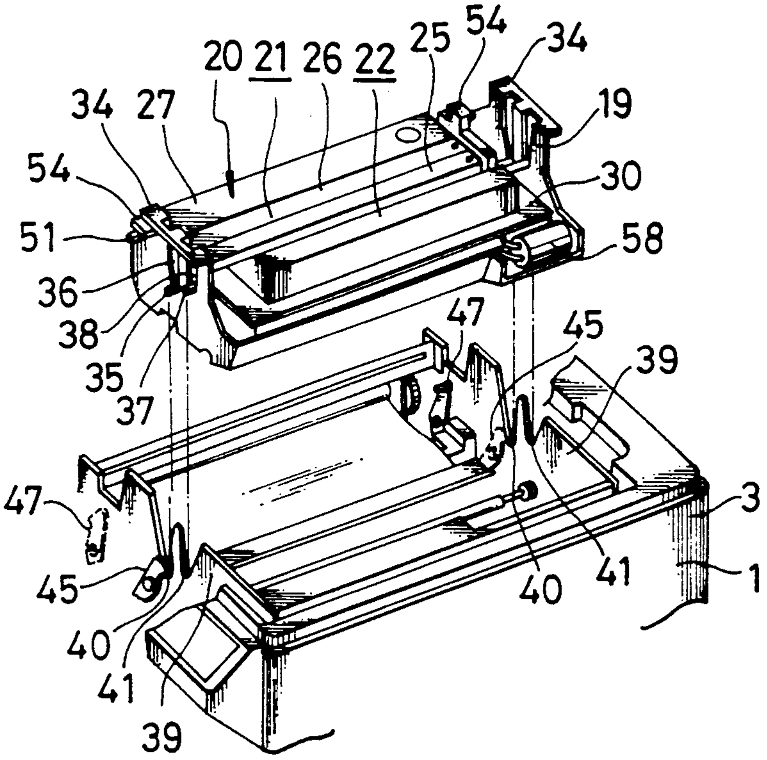
FIG. 3 is an exploded perspective view showing the relation between a lower body and the basket.
Figure 4:
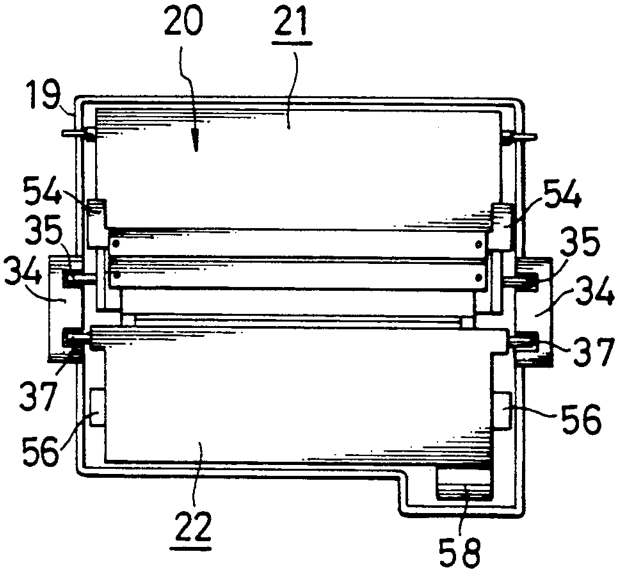
FIG. 4 is a plan view of the basket with the image forming portion contained therein.

Next, the structure for mounting the basket 19 and the image forming portion 20 is shown in FIGS. 2, 3 and 4. FIG. 2 is a side view in vertical section, showing a support structure for the basket 19 and the image forming portion 20; FIG. 3 is an exploded perspective view showing the relation between the lower body 1 and the basket 19; and FIG. 4 is a plan view of the basket 19 with the image forming portion 20 received therein. As shown in these figures, at both ends of the basket 19 there are integrally formed a pair of handles 34 positioned on both ends of the image carrier 24. In the handles 34 there are formed guide slots 36 for guiding bearings 35 vertically movably, the bearings 35 projecting from both outer sides of the support member 23 to support the image carrier 24, and guide slots 38 for guiding support shafts 37 vertically movably which shafts are projecting from both sides of the toner container 30. The transfer portion 15 and the paper separating portion 16 are positioned by frames 39 which are fixed to the upper cover 3, and are held in place with bolts. The frames 39 are each formed with a support portion 40 for positioning and supporting each bearing 35 and a fulcrum portion 41 for positioning and pivotably holding each support shaft 37, and further formed with an upright, support portion 42 which is in abutment with the lower end of the waste toner container 27 of the image carrier unit 21. The support portion 40 and the fulcrum portion 41 are each in an upwardly divergent concave shape having an upper opening.

The frames 39 are provided with retaining means 43 for resilient engagement with the image carrier unit 21. The retaining means 43 each comprise a locking lever 45 adapted to turn about a pivot shaft 44 and a locking lever 47 adapted to turn about a pivot shaft 46. The upper portions of the locking levers 45 and 47 are urged in opposite directions by virtue of a spring 48. The upper portion of one locking lever 45 is formed with a downward slant face 49 which presses the bearing 35 to the support portion 40 and an upward slant face 50 which is bent from the upper end of the downward slant face 49 in the opposite direction, while the other locking lever 47 is formed with a downward slant face 52 which presses a pin-shaped retaining projection 51 formed integrally on the outer side face of the support member 23 of the image carrier unit 21, and an upward slant face 53 which is bent from the upper end of the downward slant face 52 in the opposite direction.

Further, handles 54 are formed integrally with the housing of the destaticizer 26 which is a constituent member of the image carrier unit 21, and handles 56 are formed integrally on both outer sides of the toner container 30. The handles 54 and 56 are close to the handles 34 of the basket 19 to the extent that when the handles 34 are gripped by hands, fingers of the same hands can be brought into engagement with the handles 54 and 56. The handles 54 and 56 are formed with upward pressing portions 55, 57 and downward finger engaging portions 55*a*, 57*a*.

On the underside of the housing of the optical portion 33 there is formed a proximity portion 61 which is opposed through a predetermined gap to the upper edge of the support member 23 of the image carrier unit 21, as shown in FIG. 2.

Figure 5:
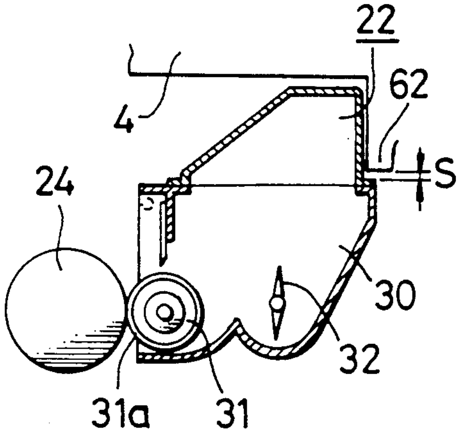
FIG. 5 is a longitudinal sectional view of a developing unit.

The fulcrum portion 41 are each positioned on the image carrier 24 side with respect to the center of gravity of the developing unit 22 and above the developing roller 31. Further, a motor 58 for driving both the developing roller 31 and the agitation blade 32 is fixed to the developing unit 22, and power input terminals 59 connected to the motor 58 project downwards from the developing unit. And a knife-shaped connector 60 which resiliently grips the power input terminals 59 is fixed to the inner surface of the frame 39 and is connected to a power source. The motor 58 is positioned in a direction leaving away from the image carrier 24 with respect to the fulcrum portions 41. As shown in FIG. 5, moreover, an opposed portion 62 which is opposed to a part of the toner container 30 through a predetermined gap s is formed on the inner surface of the top cover 4.

Figure 6:
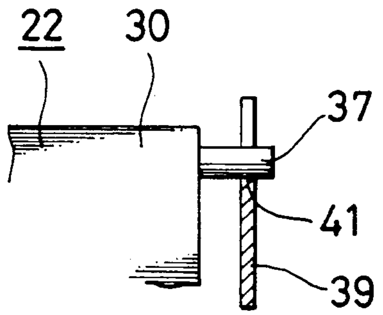
FIGS. 6 and 7 are each a front view of a part of the developing unit in a mounted state, with a frame shown in section.

FIG. 6 is a partial front view showing a state in which a support shaft 37 of the developing unit 22 is fitted in a fulcrum portion 41 of one frame 39, with the frame shown in section.

In the above construction, for remedying of jam or for maintenance, the top cover 4 is turned upwards to open the upper surface of the upper cover 3, and in this state the basket 19 is pulled up together with the image carrier unit 21 and the developing unit 22 while gripping the handles 34, whereby the paper conveying path 8 is exposed. Alternatively, by pulling up the finger engaging portions 55*a* and 57*a* with fingers, the image carrier unit 21 and the developing unit 22 can be removed independently while the basket 19 is allowed to be located in the interior of the upper cover 3.

For assembling after the remedying of jam or maintenance, the bearings 35 of the image carrier unit 21 are fitted in the guide slots 36 of the basket 19 which has been taken out of the upper cover 3 and at the same time the support shafts 37 of the developing unit 22 are fitted in the guide slots 38, then while gripping the handles 34 of the basket 19, the bearings 35 are fitted in the support portions 40 of the frames 39 and the basket 19 is accommodated in the upper cover 3 while the support shafts 37 are fitted in the fulcrum portions 41. Or the image carrier unit 21 and the developing unit 22 are accommodated in the basket 19 while the bearings 35 or the support shafts 37 are fitted in the guide slots 36 or 38 and the support portions 40 or the fulcrum portions 41. At this time, the bearings 35 whose movements in the directions other than the vertical direction are inhibited by the guide slots 36 are supported by the upward slant faces 50 and the retaining projections 51 are supported by the upward slant faces 53 of the locking lever 47, but the pressing portions 55 of the handles 54 can be pressed by idle fingers of the hands gripping the handles 34 of the basket 19. As a result of this operation, the locking levers 45 pivot in the counterclockwise direction against the force of the springs 48 by virtue of a component of force which is generated by the abutment of the bearings 35 with the upward slant faces 50, thereby permitting a downward movement of the bearings 35. Likewise, the retaining projections 51 are supported by the upward slant faces 53 of the locking levers 47, and by virtue of a component of force which is generated by the abutment of the retaining projections 51 with the upward slant faces 53 upon depression of the pressing portions 55 of the handles 54, the locking levers 47 pivot in the clockwise direction against the force of the springs 48, thus permitting a downward movement of the retaining projections 51. The locking levers 45 which have returned to the original positions by the restoring force of the springs 48 press the bearings 35 against the bottoms of the support portions 40 through the downward slant faces 49 thereof. Similarly, the downward slant faces 52 of the locking levers 47 press the retaining projections 51 downwards, so that the lower edges of both side portions of the support member 23 are brought into pressure contact with the support portions 42.

By virtue of the own weight of the developing unit 22 the support shafts 37 are positioned in the fulcrum portions 41 which serves as a fulcrum to pivotally support the developing unit 22. Since the fulcrum portions 41 are positioned above the developing roller 31 and since the fulcrum portions 41 and the developing roller 31 are located on the same side of the developing unit 22, that the image carrier 24 is located, the developing unit 22 pivots in the clockwise direction about the fulcrum portions 41, so that the projections 31*a* formed at both ends of the developing roller 31 come into abutment with the outer periphery of the end portions of the image carrier 24, whereby the gap between the intermediate portion of the image carrier 24 and that of the developing roller 31 is maintained constant and in this stable state the developing unit 22 is mounted to the frames 39.

Thus, since the image carrier unit 21 and the developing unit 22 are mounted in a stable state to the frames 39 which serve to position and fix the transfer portion 15 and the paper separating portion 16, the position of the image carrier 24 relative to the transfer portion 15 and the paper separating portion 16 can be determined accurately.

When the basket 19 is pulled up for the remedying of jam or for maintenance, the bearings 35 press the downward slant faces 49 of the locking levers 45, and by virtue of a component of force generated by the abutment of the two the locking levers 45 turn in the counterclockwise direction against the force of the springs 48, thereby permitting an upward movement of the bearings 35. Likewise, the retaining projections 51 press the downward slant faces 52 of the locking levers 47, and by virtue of a component of force generated by the abutment of the two the locking levers 47 turn in the clockwise direction against the force of the springs 48, thereby permitting an upward movement of the retaining projection 51.

Further, with the opposed portion 62 of the top cover 4, it is possible to prevent the developing unit 22 from being floated by strong vibrations during transport for example. In this case, by forming the opposed portion 62 using a shock absorbing material, even interference thereof with the developing unit 22 would cause no damage. Moreover, since the opposed portion 62 is opposed to the developing unit 22 through the predetermined gap s, the vibration which is created by the application of an external force to the top cover 4 can be prevented from being transmitted to the developing unit 22. The proximity portion 61 presses the support member 23 upon closing of the top cover 4 even when the mounted state of the support member 23 is incomplete. But when the support member 23 is fixed in its predetermined position, there is formed a slight gap between the proximity portion 61 and the support member 23, so there is no fear of vibration being transmitted from the top cover 4 to the support member 23. Since the number of components mounted through the frames 39 is large and heavy components are also required to be supported, the lower body 1 has high rigidity and is placed on a stable base or desk, so it scarcely vibrates. Thus, there is no fear of harmful vibrations being transmitted from the lower body 1 to the developing unit 22 and the image carrier unit 21.

Figure 7:
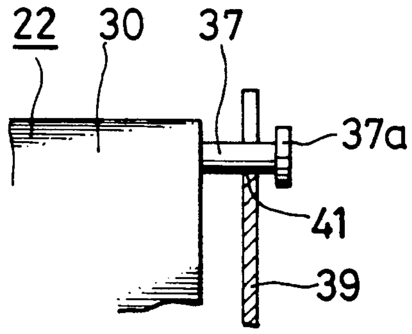

By using metallic support shaft 37 it is possible to prevent the abrasion thereof caused by contact with the frames 39 which are metallic. As a result, the developing unit 22 can be positioned with a high accuracy. Of course, for improving the productivity, there may be adopted a method wherein the support shafts 37 are formed, by molding integrally with the toner container 30 using a resin. In this case, synthetic resin chips for contact with the support shafts 37 may be stuck to the frames 39 in suitable positions, or the frames 39 themselves may be formed using a synthetic resin to prevent the abrasion of the support shafts 37. As shown in FIG. 7, moreover, a projecting portion 37*a* may be formed at an end of each support shaft 37. The projecting portion 37*a* comes into contact with the side face of each frame 39 to serve as a guide member when the support shaft 37 is fitted in the fulcrum portion 41 and it also serves to prevent vibrations in the transverse direction of the developing unit 22. Moreover, even when the frame 39 is deformed and expanded in its width, the width can be corrected by fitting the support shaft 37 in the fulcrum portion 41.

What is claimed is:

1. An image forming apparatus comprising:

a lower body containing a paper conveying path and a transfer portion disposed in said paper conveying path;

an upper body connected to the upper surface of said lower body so as to be openable and closable;

an image forming portion comprising an image carrier unit and a developing unit, said image carrier unit having an image carrier;

support portions formed in said lower body so as to abut said image forming portion; and retaining means provided in said lower body so as to engage said image forming portion, said retaining means comprising means for pressing said image forming portion in a direction toward said support portions so as to lock said image forming portion to said support portions.

2. An image forming apparatus according to claim 1, wherein said image carrier unit and a toner container provided in said developing unit are provided with handles each comprising an upward pressing portion and a downward finger engaging portion.

3. An image forming apparatus according to claim 1, wherein said paper conveying path is exposed by lifting said image forming portion.

4. An image forming apparatus comprising:

a lower body containing a paper conveying path and a transfer portion disposed in said paper conveying path;

an upper body connected to the upper surface of said lower body so as to be openable and closable;

an image forming portion comprising an image carrier unit and a developing unit, said image carrier unit having an image carrier;

a plurality of retaining projections provided on both sides of said image forming portion;

support portions formed on both sides of said lower body so as to come into abutment from below with part of said image forming portion including said retaining projections; and locking levers mounted pivotably to said lower body, each of said locking levers being urged in one direction and having a downward slant face adapted to abut an associated one of said retaining projections and also having an upward slant face which is bent from the upper end of said downward slant face in the opposite direction, wherein said locking levers urge said image forming portion toward said support portions.

5. An image forming apparatus according to claim 4, wherein said locking levers are provided at least two on one side so as to be each pivotable about a pivot shaft, said locking levers on each side being urged by a spring so that the respective upper ends move in directions opposite to each other.

6. An image forming apparatus comprising:

a lower body containing a paper conveying path and a transfer portion disposed in said paper conveying path;

an upper body connected to the upper surface of said lower body so as to be openable and closable;

an image forming portion comprising an image carrier unit and a developing unit, said image carrier unit having an image carrier;

a plurality of retaining projections provided on both sides of said image forming portion;

support portions formed on both sides of said lower body so as to come into abutment from below with part of said image forming portion including said retaining projections;

locking levers mounted pivotably to said lower body, each of said locking levers being urged in one direction and having a downward slant face adapted to abut an associated one of said retaining projections and also having an upward slant face which is bent from the upper end of said downward slant face in the opposite direction, wherein said locking levers urge said image forming portion toward said support portions; and a proximity portion provided in said upper body so as to be opposed to said image forming portion through a predetermined gap.

7. An image forming apparatus according to claim 1, wherein said developing unit comprises a developing roller, one of said support portions formed in said lower body being used as a fulcrum portion, said fulcrum portion being positioned above said developing roller and on the same side of said developing unit that the image carrier is located.

* * * * *